A. E. PAIGE.
STEERING WHEEL.
APPLICATION FILED AUG. 23, 1921.
1,416,413.
Patented May 16, 1922.
4 SHEETS—SHEET 1.
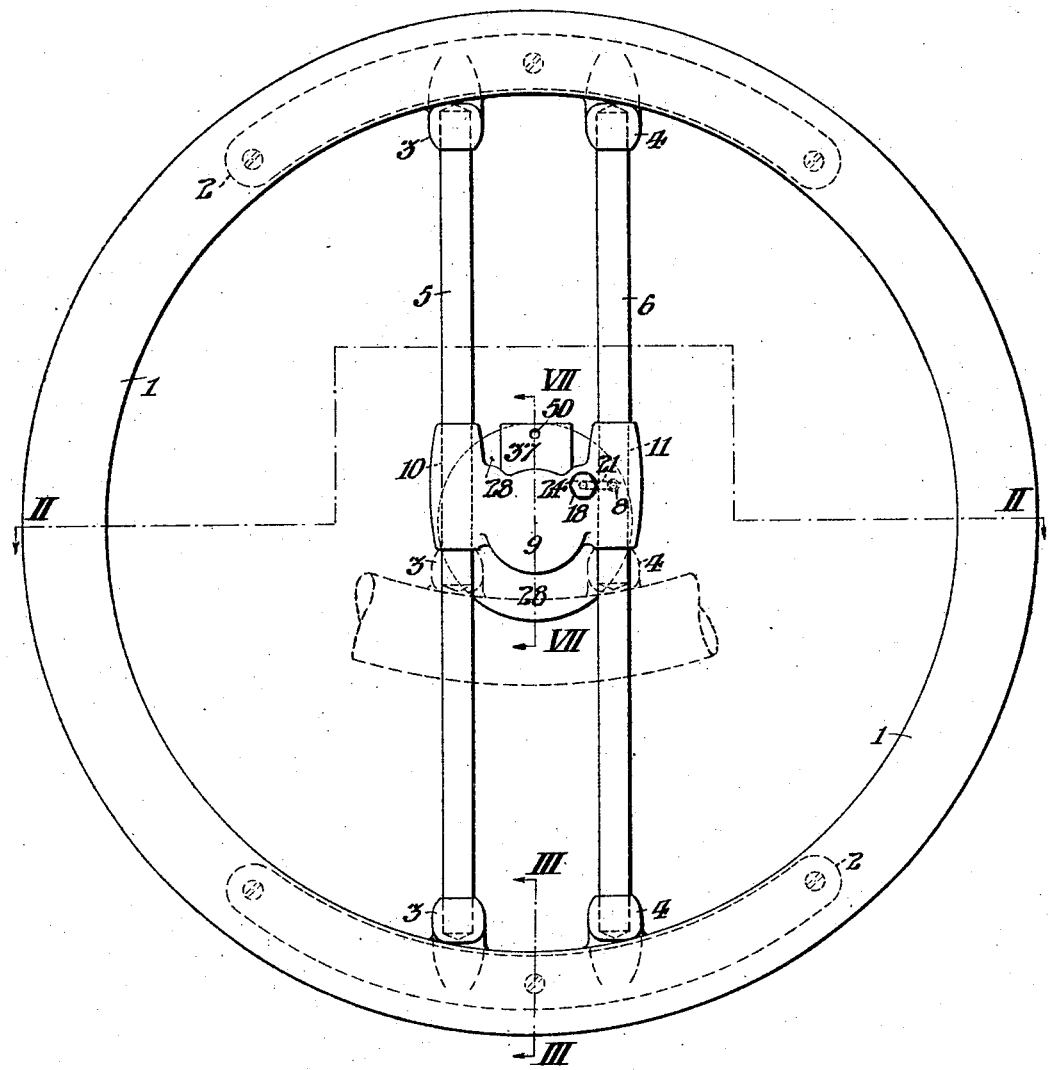
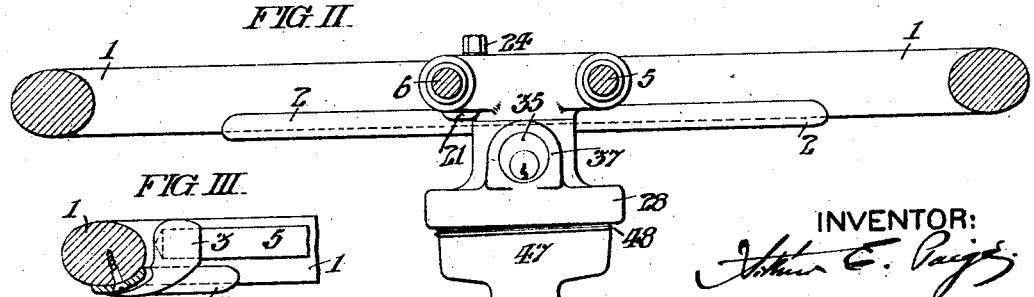
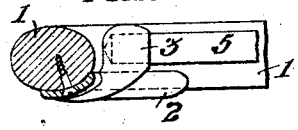
INVENTOR:

A. E. PAIGE.
STEERING WHEEL.
APPLICATION FILED AUG. 23, 1921.
1,416,413.
Patented May 16, 1922.
4 SHEETS—SHEET 2.
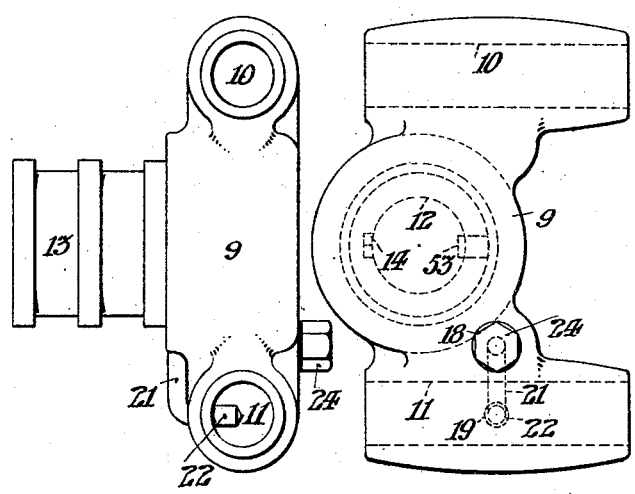
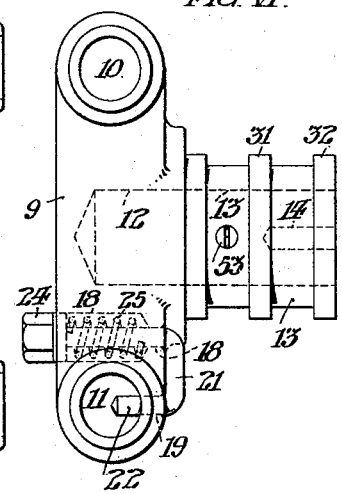
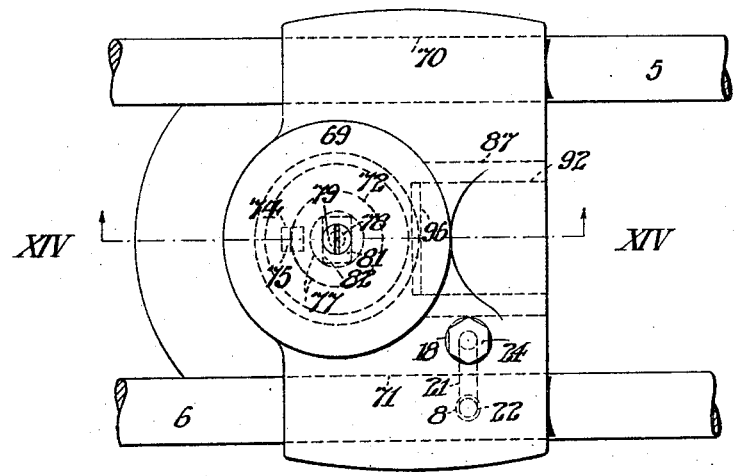
INVENTOR:

A. E. PAIGE.
STEERING WHEEL.
APPLICATION FILED AUG. 23, 1921.
1,416,413.
Patented May 16, 1922.
4 SHEETS—SHEET 3.
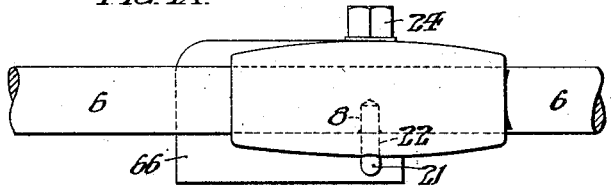
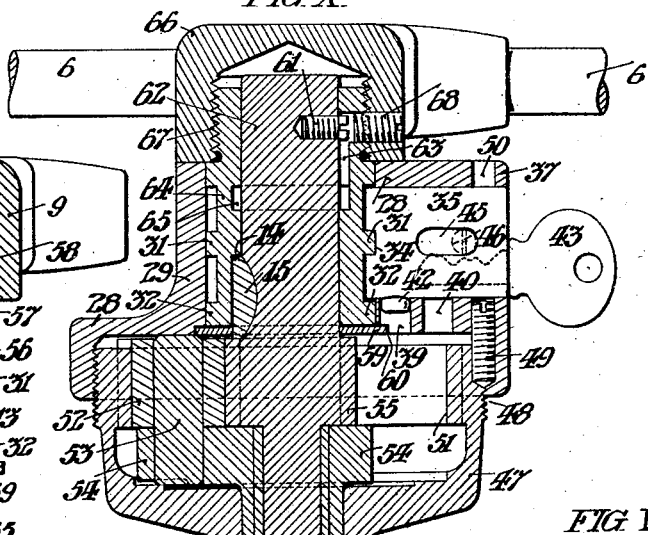
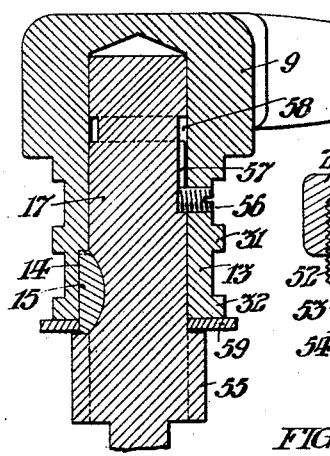
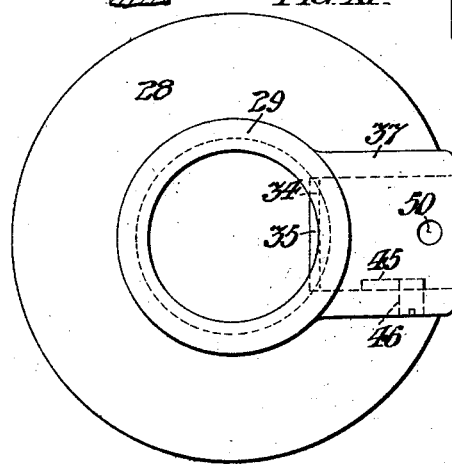
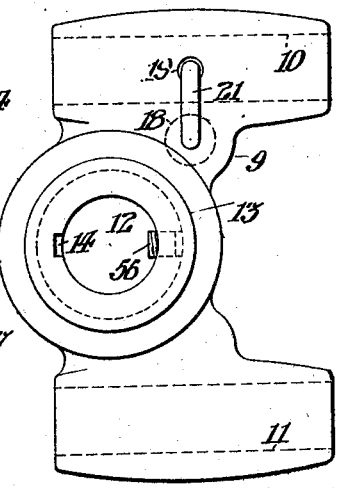
INVENTOR:
Arthur E. Paige.

A. E. PAIGE.
STEERING WHEEL.
APPLICATION FILED AUG. 23, 1921.
1,416,413.
Patented May 16, 1922.
4 SHEETS—SHEET 4.
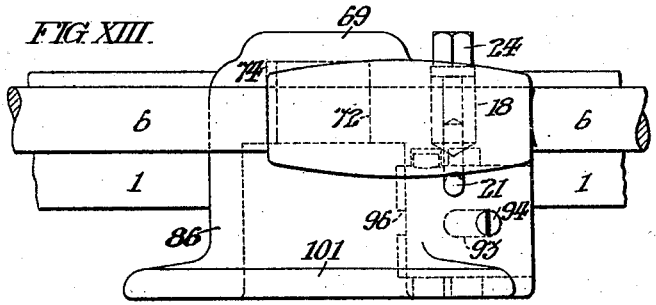
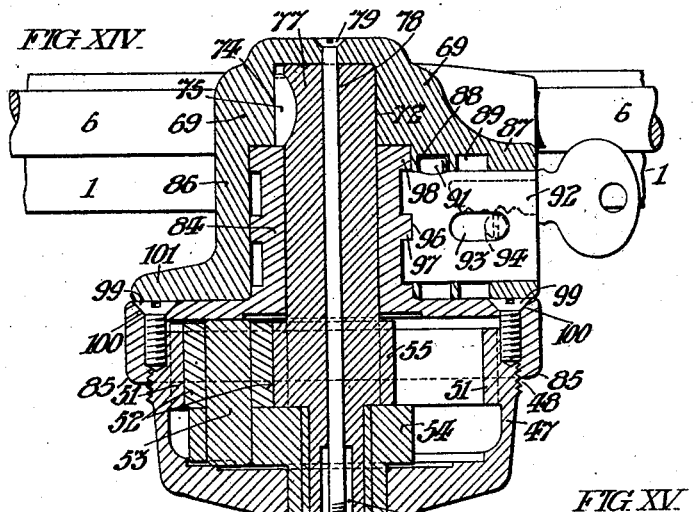
INVENTOR:
Arthur E. Paige

UNITED STATES PATENT OFFICE.

ARTHUR E. PAIGE, OF PHILADELPHIA, PENNSYLVANIA.

STEERING WHEEL.

1,416,413. Specification of Letters Patent. Patented May 16, 1922.

Application filed August 23, 1921. Serial No. 494,606.

*To all whom it may concern:*

Be it known that I, ARTHUR E. PAIGE, a citizen of the United States, residing at Philadelphia, in the State of Pennsylvania, have invented a certain new and useful Improvement in Steering Wheels, whereof the following is a specification, reference being had to the accompanying drawings.

My invention relates to an automotive vehicle steering wheel capable of being axially shifted to and from operative relation with the rotary steering shaft upon which it is mounted. It is also characteristic of the form of my invention hereinafter described; that said wheel is slidably connected with its hub so as to be capable of radial reciprocation with respect thereto, so as to facilitate the ingress and egress of the operator with respect to the chauffeur's seat. Said hub member is provided with two forms of locking means, one form so constructed and arranged that said hub may be shifted axially to and from its operative and inoperative positions, and be locked, by key-controlled means, both in its operative position in which said wheel is rigidly connected with the steering shaft and adapted to turn said shaft, and in its inoperative position, in which said wheel can only be idly turned on said shaft, without turning the latter. The other locking means are so constructed and arranged that said wheel is automatically locked in rigid connection with said hub when the wheel is presented in concentric relation with the steering shaft; that locking means being spring pressed and releasable by a manually operative push button when it is desired to shift the wheel eccentrically to its axis.

However, the construction and arrangement of the wheel and its hub which are involved in shifting the wheel radially and automatically locking it, are the subject matter of my other application for Letters Patent of the United States Serial No. 293,631 filed August 19, 1921, and the claims in this case relate more particularly to the construction and arrangement involved in shifting said wheel axially.

My invention includes the various novel features of construction and arrangement hereinafter more definitely specified.

In said drawings; Fig. I is a plan view of a steering wheel and its appurtenances embodying a convenient form of my invention.

Fig. II is a sectional view of said wheel, taken on the line II, II in Fig. I.

Fig. III is a fragmentary radial sectional view of said wheel, taken on the line III, III in Fig. I.

Fig. IV is a plan view of the hub member shown in Fig. I.

Fig. V is a left hand side elevation of said hub member as shown in Fig. IV.

Fig. VI is a right hand side elevation of said hub member as shown in Fig. IV.

Fig. VII is a vertical sectional view of said hub member, taken on the line VII, VII in Fig. I, showing its connection with the steering shaft.

Fig. VIII is an inverted plan view of said hub member, shown in Figs. I to VII inclusive.

Fig. IX is a side elevation of a modified form of hub member, without its detachable axial sleeve; with fragments of the wheel slide rods extending through its parallel bores.

Fig. X is a vertical sectional view of a steering shaft, its stationary bearing, and other appurtenances, with the form of my invention shown in Fig. IX applied thereto.

Fig. XI is a detached plan view of said stationary bearing, shown in Fig. X; which is also shown in Figs. I and II.

Fig. XII is a plan view of a modified form of wheel hub, with fragments of the wheel slide rods extending through its parallel bores; said hub differing from those shown in the preceding figures in that it is arranged to carry the lock by which it is held in operative and inoperative relation to the steering shaft.

Fig. XIII is a side elevation of the structure shown in Fig. XII, and including a fragmentary portion of the wheel rim.

Fig. XIV is a vertical sectional view of a steering shaft, its stationary bearing, and other appurtenances, with the form of my invention shown in Figs. XII and XIII applied thereto; section being taken on the line XIV, XIV in Fig. XII.

Fig. XV is a fragmentary inverted plan view of the hub member shown in Figs. XII to XIV inclusive.

Fig. XVI is a detached plan view of the stationary bearing for the steering shaft shown in Fig. XIV.

Referring to the form of my invention shown in Figs. I to VIII inclusive; the steering wheel includes the annular rim 1 which is conveniently formed of wood or a non-metallic composition. Two similar brackets 2 are mounted on said rim 1 at diametrically opposite sides thereof; each of said brackets having, in unitary relation therewith, two cylindrical sockets 3 and 4; said sockets being parallel with each other in each bracket, and said sockets 3 and 4 in each bracket being respectively in axial alinement with the sockets 3 and 4 in the other bracket. The pair of cylindrical rods 5 and 6 have their opposite ends respectively engaged in said sockets in said brackets and said rods extend in parallel relation with each other from side to side of said rim 1. Said rod 6 has the locking bolt recess 8; whereby said wheel rim is normally secured in concentric relation with the steering shaft as hereinafter described.

The hub member 9 has the pair of cylindrical bores 10 and 11 extending therethrough in parallel relation with each other, and respectively engaging said rods 5 and 6 in slidable relation. Said hub member 9 has the axial bore 12 at right angles to the plane of said rim 1 and arranged for presentation in coaxial relation with said rim, and said hub member has the axial tubular sleeve 13 in concentric relation with said axial bore 12, and provided with means, including the keyway 14 arranged to slidably engage the key 15 in the steering shaft 17 to hold said hub member 9 in operative relation with said shaft, when said hub member is lowered to the position on said shaft which is best shown in Fig. VII. Said hub member has two locking plunger bores 18 and 19 in parallel relation with said axial bore 12 and the J-shaped locking plunger 21 is arranged to reciprocate in said plunger bores 18 and 19; said plunger including the locking bolt 22 arranged to engage said locking bolt recess 8 when the axial bore 12 of said hub member is in concentric relation with the axis of said rim. Said locking plunger 21 has the push cap nut 24, normally extending above said hub member 9 and adapted to reciprocate in said plunger bore 18. The helical spring 25 encircles said plunger 21 within that plunger bore 18 of said hub member, beneath said cap nut 24; whereby said locking plunger 21 is normally spring pressed to engage said locking bolt recess 8 in said rod 6 and retain the wheel in concentric relation with said hub member 9.

The stationary bearing 28 for said steering shaft 17 includes the tubular flange 29 in concentric relation with said shaft and in which said sleeve 13 is journaled, and said sleeve 13 has two annular ribs 31 and 32 in axially spaced relation, adapted to be selectively engaged in the transverse groove 34 in the inner end of the lock body 35 which is mounted to reciprocate radially with respect to said shaft 17, in the lock socket 37, which is in unitary relation with said stationary bearing 28. Said lock socket 37 has two circular recesses 39 and 40, extending at right angles to the axis of said socket and, conveniently, parallel with said axial sleeve 13, but in radially spaced relation. Said lock body 35 includes the locking plunger 42, which is controlled by the key 43, and arranged to be selectively projected into said recesses 39 and 40. Said lock body 35 also has the slot 45 in its circumference, extending parallel with its axis, to limit the extent of the reciprocatory movement of said lock body, by engagement with the stop screw 46 which is carried by said stationary bearing member 28 and extends within said slot 45, as indicated in dotted lines in Fig. X.

Said stationary bearing 28 is conveniently formed as the cover for the gear casing 47, to which it is connected by the screw thread 48. Felonious removal of said cover is prevented by the single screw 49, which extends through said cover 28 in threaded engagement with said casing 47, as shown in Fig. X. Said screw 49 is covered by said lock 35, when the latter is locked as shown in Fig. X, but may be readily removed with a screw driver inserted in the hole 50 at the top of said casing 28, only when said lock is entirely withdrawn from said casing.

Said gear casing 47 is of the "Ford" type and has the internal gear 51 formed in unitary relation therewith and engaged with three planetary pinions 52 which are mounted to rotate on the studs 53 which are rigidly connected with the drive pinion shaft bushing 54 which is rotatable in said internal gear casing 47. Said three pinions 52 engage the pinion 55 which is conveniently formed in unitary relation with said steering shaft 17. Said gearing serves merely to afford a desired degree of leverage in the transmission of power from said steering wheel to said bushing 54, which is operatively connected with the dirigible wheels of the vehicle.

It is to be understood that the construction and arrangement above described is such; that said rim 1 is normally rigidly retained in concentric relation with said steering shaft 17, by the engagement of said locking plunger 21 with the locking bolt recess 8 in said slide rod 6; but said rim and its rod may be instantly released by manually pushing downward on said locking plunger cap nut 24, so that said rim may be then readily shifted radially with respect to its hub member 9, away from the operator, to such eccentric position with respect to its steering shaft 17, as to afford abnormal space between said wheel and the chauffeur's seat to facilitate the egress and ingress of the operator. Such movement of the wheel rim may be thus instantly effected at any time, regardless of whether the wheel is in operative or inoperative relation with its steering shaft 17 aforesaid.

Moreover, it is to be understood; that the construction and arrangement above described is such that said lock body 35 is normally held in locked position in said hub member 28, by the engagement of said locking plunger 42 in the circular locking recess 39, with said hub member 9 at the lower limit of its axial movement; in which position, said hub member 9 may be turned by said rim 1 to operate the steering mechanism of the vehicle, without restriction.

However, when it is desired to lock the steering wheel and its appurtenances, shown in Figs. I to VIII inclusive; so that it is incapable of operating the steering mechanism; said locking plunger 42 is retracted by turning said key 43 and withdrawn, to the extent of the slot 45, so that said locking plunger 42 may snap into the outer circular locking recess 40, to prevent the accidental inward movement of said lock body 35, while said steering wheel is raised to the upper limit of its axial movement with respect to said steering shaft 17. Such axial movement is conveniently limited by the stop screw 56 which, as shown in Fig. VII, extends through said sleeve 13 into the slot 57 in said steering shaft 17, which slot extends parallel with the axis of said shaft into the annular groove 58. Such axial movement of said hub member 9 is sufficient to raise said sleeve 13 until the keyway 14 therein clears the key 15 in said shaft; so that when said stop screw 56 registers with said annular groove 58, the steering wheel is free to turn idly upon said shaft without turning the latter. Said steering wheel, including said hub member 9, is then locked in said upper idle position, by turning said key 43 to retract said locking bolt 42 from the locking bolt recess 40 and then thrusting said lock body 35 inwardly, to reengage said locking bolt 42 with said locking bolt recess 39 in the bearing 28, but with the groove 34 of said lock body 35 in engagement with the annular rib 32 on said sleeve 13.

Axial movement of said steering shaft 17 is continuously prevented by the washer 59 which encircles said shaft, and holds said key 15 in its engagement with said shaft; said washer being seated in the annular recess 60 in said stationary bearing 28 as shown in Fig. X.

However, it is to be understood that said screw 56 may be removed to release said hub member 9 from said shaft 17 by turning the steering wheel until said screw is presented in registry with the lock socket 37, with said lock body 35 withdrawn from said socket. Moreover, said shaft may be withdrawn from its normal position when said bearing 28 is removed from said gear casing 47.

Although I prefer to employ the screw stud 56 in cooperation with said slot 57, as shown in Fig. VII, as the means arranged to limit the axial movement of the hub member with respect to the steering shaft; I have shown in Figs. IX and X, a modified form of my invention, wherein the stop stud screw 61 is substituted for said screw 56. Said screw 61 is carried by the steering shaft 62 shown in Fig. X which differs from said steering shaft 17 in that it has no slot 57 or groove 58; but otherwise is constructed and arranged like said shaft 17. Said screw 61 extends into the slot 63 in the sleeve 64 which is parallel with the axis of said shaft 62 and terminates in the annular groove 65 in said sleeve 64, as shown in Fig. X; so that when said sleeve 64 is raised, its axial movement is limited by said screw 61 and slot 63 and said sleeve is free to turn, idly, upon said shaft 62 when said screw 61 registers with said groove 65. In that form of my invention shown in Fig. X; I find it convenient to form the sleeve 64 as a separable part of the hub member 66 to which it is rigidly connected by the screw thread 67. Accidental separation of said sleeve 64 from said hub member 66 is prevented by the set screw 68 which extends through the wall of said hub member 66 into said sleeve 64. As shown in Fig. X; said hub member 66 may be turned to present said screw 68 in registry with said screw 61, so that both of said screws may be withdrawn through the same hole when it is desired to remove said hub member 66 from said steering shaft 62.

The separable sleeve construction last above described is advantageous in that such a sleeve as indicated at 64 may be formed of die cast metal, or hardened steel, independently of the hub member in which it is mounted; whereas, the sleeve 13, shown in Fig. VII, is formed in unitary relation with the hub member 9 and is preferably made of cast iron or steel.

It is characteristic of both forms of my invention above described that the lock body, whereby the steering wheel may be held in operative or inoperative relation with the steering shaft, is mounted in the stationary bearing, independently of the steering wheel. However, I have shown in Figs. XII to XVI inclusive, an embodiment of my invention wherein the lock body is carried by the steering wheel, independently of the stationary bearing of the steering shaft with respect to which the wheel is thus locked.

In that form of my invention; the hub member 69 is provided with a pair of cylindrical bores 70 and 71 for sliding engagement with said rods 5 and 6 which are rigidly connected with the steering wheel rim 1, as above described, and said hub member 69 has the axial bore 72 with the keyway 74 fitted to slide upon the key 75 of the steering shaft 77 which has the central bore 78 for the stop screw 79 which has at its lower end the nut 81 fitted in the diametrical slot 82 in said shaft, so that it will not turn therein. Said slot 82 is of such extent as to limit the axial movement of said hub member 69 with respect to said shaft 77 when said screw 79 is engaged with said nut 81, as shown in Fig. XIV. However, when it is desired to remove said hub member from said shaft, said screw 79 may be unscrewed from said nut 81 which is prevented from falling out of said slot 82 by the inwardly swaged bottom edges 83 of said slot. However, said nut 81 may be removed and inserted laterally with respect to said slot 82 when said shaft 77 is withdrawn from the tubular sleeve 84 of the stationary bearing 85 in which it is journaled.

Said hub member 69 has the tubular sleeve 86 which is journaled on said tubular sleeve 84 of said stationary bearing 85 as shown in Fig. XIV, and said hub member 69 includes the lock casing 87, extending in radial relation to the axis of said shaft 77 and provided with two locking bolt recesses 88 and 89 in radially spaced relation for selective engagement with the lock body 92 which is mounted to reciprocate radially in said socket 87 to the extent limited by the slot 93 in said lock body and the screw 94 in said lock socket 87 in the manner above described. However, said lock body 92, which otherwise resembles the lock body 35 aforesaid, is turned to present its locking plunger 91 upwardly, so that said locking plunger may not be feloniously thrust inwardly to release the lock body from its locked position, when said hub member 69 is raised as might be done if said locking plunger 91 were presented downwardly; for the perforated under surface of the lock casing 87 is then accessible.

Said hub member may be locked at the lower limit of its axial movement, where it is in operative relation with said steering shaft 77, and also locked at the upper limit of its axial movement, where it is free to turn idly with respect to said shaft, without turning movement of the latter; by the engagement of the transverse groove 96, of said lock body 92, with the respective annular ribs 97 and 98 on said tubular sleeve 84 of the stationary bearing 85; such construction and arrangement by the reversal of that characteristic of the other two forms of my invention above described wherein the annular detaining members 31 and 32 are on the hub member, instead of on the stationary bearing.

Said stationary bearing 85, shown in Fig. XIV, is a cover for the gear casing 47 and interchangeable with the stationary bearing 28 above described. However, said stationary bearing 85 may be conveniently retained in connection with the gear casing 47 by two screws 99, shown in Fig. XIV, which extend through holes 100 in said bearing 85 into engagement with said casing 47 and are shielded from felonious attack by the annular flange 101 on said hub member 69.

It may be observed that in the form of my invention shown in Fig. XIV; removal of the steering shaft 77 is prevented by its engagement in the tubular sleeve 84 of the stationary bearing 85, without the interposition of any retaining washer such as is shown at 59 in Figs. VII and X. Moreover, it is to be particularly noted that it is characteristic of each form of my invention above described that there is no axial movement of the steering shaft or any portion thereof, incident to the shifting of the steering wheel axially to and from its operative and inoperative positions.

Although I have referred to the annular ribs 31 and 32 in Figs. VII and X and the annular ribs 97 and 98 in Fig. XIV, as the detent members which are engaged by the lock body to hold the steering wheels in operative and inoperative relation with the respective steering shafts; it may be observed, with reference to Figs. VII, X and XIV that said ribs are formed by annular grooves upon opposite sides thereof and that said lock bodies 35 and 92 extend into such grooves. Therefore, it is to be understood that in the appended claims the terms "annular members" and "detent members" are intended to be comprehensive of both or either ribs or grooves. Moreover, although I find it convenient to mount the locking mechanism to reciprocate in radial relation to the axis of the steering shaft as above described; it is to be understood that suitable locking means may be otherwise arranged.

Therefore, I do not desire to limit myself to the precise details of construction and arrangement herein set forth, as it is obvious that various modifications may be made therein without departing from the essential features of my invention, as defined in the appended claims.

I claim:

1. In a steering wheel; the combination with a hub member having an axial bore for a steering shaft, and means arranged to carry an annular rim in a plane at right angles to said bore and in coaxial relation therewith, and having an axial sleeve, in concentric relation with said axial bore, said sleeve being provided with two annular ribs in axially spaced relation; of a steering shaft mounted to slide axially in the axial bore of said hub member; means operatively connecting said hub member and shaft arranged to connect them, at the lower limit of such axial movement, so that said shaft may then be turned by said wheel, and to disconnect them at the upper limit of such axial movement, so that said wheel may there be turned idly on said shaft, without turning the latter; a stationary bearing for said steering shaft, having a journal for said axial sleeve and a lock socket in radial relation to said journal, and two locking bolt recesses, in said bearing, in radially spaced relation, extending from said lock socket; a lock body mounted to reciprocate in said lock socket, in said bearing, having a groove arranged to selectively engage said ribs and having a key-controlled lock plunger mounted to reciprocate radially in said lock body, with its axis at right angles to the axis of said lock body, and to selectively register with said locking bolt recesses; whereby said lock body may be rigidly connected with said bearing, in engagement with either of said ribs, and maintain said wheel in rigid relation with said steering shaft, when engaged with the upper one of said ribs, and maintain said steering wheel disengaged from said steering shaft when engaged with the lower one of said ribs; and means, including a screw stud detachably secured in said steering shaft, in engagement with a keyway in said sleeve, arranged to limit the axial movement of said hub member with respect to said steering shaft and prevent accidental removal of said wheel from said bearing when said lock body is disengaged from both of said ribs.

2. In a steering wheel; the combination with a hub member having an axial bore for a steering shaft and an axial sleeve, in concentric relation with said axial bore, said sleeve being provided with two annular ribs in axially spaced relation; of a steering shaft mounted to slide axially in the axial bore of said hub member; key means arranged to operatively connect said hub member and shaft at the lower limit of such axial movement, so that said shaft may then be turned by said wheel, and to disconnect them at the upper limit of such axial movement, so that said wheel may there be turned idly on said shaft, without turning the latter; a stationary bearing for said steering shaft, having a journal for said axial sleeve, a lock socket in radial relation to said journal, and a locking bolt recess extending from said lock socket; a lock body mounted to reciprocate in said lock socket, in said bearing, having a groove arranged to selectively engage said ribs and having a key-controlled lock plunger mounted to reciprocate radially in said lock body, with its axis at right angles to the axis of said lock body, and to engage said locking bolt recess; whereby said lock body may be rigidly connected with said bearing, in engagement with either of said ribs, and maintain said wheel in rigid relation with said steering shaft, when engaged with the upper one of said ribs, and maintain said steering wheel disengaged from said steering shaft when engaged with the lower one of said ribs; and means, including a screw stud detachably secured in said steering shaft, in engagement with a keyway in said sleeve, arranged to limit the axial movement of said hub member with respect to said steering shaft and prevent accidental removal of said wheel from said bearing when said lock body is disengaged from both of said ribs.

3. In a steering wheel; the combination with a hub member having an axial bore for a steering shaft and an axial sleeve, in concentric relation with said axial bore, said sleeve being provided with two annular ribs in axially spaced relation; of a steering shaft mounted to slide axially in the axial bore of said hub member; means arranged to operatively connect said hub member and shaft at the lower limit of such axial movement, so that said shaft may then be turned by said wheel, and to disconnect them at the upper limit of such axial movement, so that said wheel may there be turned idly on said shaft, without turning the latter; a stationary bearing for said steering shaft, having a journal for said axial sleeve and a lock socket in radial relation to said journal, a lock body mounted in said lock socket, in said bearing, having means arranged to selectively engage said ribs; whereby said lock body may be rigidly connected with said bearing, in engagement with either of said ribs, and maintain said wheel in rigid relation with said steering shaft, when engaged with the upper one of said ribs, and maintain said steering wheel disengaged from said steering shaft when engaged with the lower one of said ribs; and means, detachably arranged in said hub member to limit the axial movement of said hub member with respect to said steering shaft and prevent accidental removal of said wheel from said bearing when said lock body is disengaged from both of said ribs.

4. In a steering wheel; the combination with a hub member having an axial bore for a steering shaft and an axial sleeve, in concentric relation with said axial bore, said sleeve being provided with two annular members in axially spaced relation; of a steering shaft mounted to slide axially in the axial bore of said hub member; means arranged to operatively connect said hub member and shaft at the lower limit of such axial movement, so that said shaft may then be turned by said wheel, and to disconnect them at the upper limit of such axial movement, so that said wheel may there be turned idly on said shaft, without turning the latter; a stationary bearing for said steering shaft, having a journal for said axial sleeve and a lock socket; a lock body mounted in said lock socket, in said bearing, having a groove arranged to selectively engage said annular members; whereby said lock body may be rigidly connected with said bearing, in engagement with either of said annular members, and maintain said wheel in rigid relation with said steering shaft, when engaged with the upper one of said annular members, and maintain said steering wheel disengaged from said steering shaft when engaged with the lower one of said annular members; and means arranged to limit the axial movement of said hub member with respect to said steering shaft and prevent accidental removal of said wheel from said bearing when said lock body is disengaged from both of said annular members.

5. In a steering wheel; the combination with a hub member having an axial bore for a steering shaft and an axial sleeve, in concentric relation with said axial bore, said sleeve being provided with two annular members in axially spaced relation; of a steering shaft mounted to slide axially in the axial bore of said hub member; means arranged to operatively connect said hub member and shaft, so that said shaft may be turned by said wheel, and to disconnect them so that said wheel may be turned idly on said shaft, without turning the latter, in accordance with the axial position of said hub member, on said shaft; a stationary bearing for said steering shaft, having a journal for said axial sleeve and a lock socket; detachable means connecting said shaft with said bearing, arranged to prevent axial movement of said shaft; a lock body mounted in said lock socket, in said bearing, having means arranged to selectively engage said annular members; whereby said lock body may be rigidly connected with said bearing, in engagement with either of said annular members and maintain said wheel in operative relation with said steering shaft, when engaged with the upper one of said annular members, and maintain said steering wheel disengaged from said steering shaft when engaged with the lower one of said annular members; and means arranged to limit the axial movement of said hub member with respect to said steering shaft and prevent accidental removal of said wheel from said bearing when said lock body is disengaged from both of said annular members.

6. In a steering wheel; the combination with a hub member having an axial bore for a steering shaft and an axial sleeve, in concentric relation with said axial bore, said sleeve being provided with two detent members in axially spaced relation; of a steering shaft mounted to slide axially in the axial bore of said hub member; means arranged to operatively connect said hub member and shaft, so that said shaft may be turned by said wheel, and to disconnect them so that said wheel may be turned idly on said shaft, without turning the latter, in accordance with the axial position of said hub member, on said shaft; a stationary bearing for said steering shaft, having a journal for said axial sleeve; detachable means connecting said shaft with said bearing, arranged to prevent axial movement of said shaft; a lock body having means arranged to selectively engage said detent members; whereby said hub member may be connected with said bearing, with said lock body in engagement with either of said detent members and maintain said wheel in operative relation with said steering shaft, when engaged with the upper one of said detent members, and maintain said steering wheel disengaged from said steering shaft when engaged with the lower one of said detent members; and means arranged to limit the axial movement of said hub member with respect to said steering shaft and prevent accidental removal of said wheel from said bearing when said lock body is disengaged from both of said detent members.

7. In a steering wheel; the combination with a hub member having an axial bore for a steering shaft and an axial sleeve, in concentric relation with said axial bore, said sleeve being provided with two detent members in axially spaced relation; of a steering shaft mounted to slide axially in the axial bore of said hub member; means arranged to operatively connect said hub member and shaft, so that said shaft may be turned by said wheel, and to disconnect them so that said wheel may be turned idly on said shaft, without turning the latter, in accordance with the axial position of said hub member, on said shaft; a stationary bearing for said steering shaft, having a journal for said axial sleeve; detachable means connecting said shaft with said bearing, arranged to prevent axial movement of said shaft; and a lock body having means arranged to selectively engage said detent members; whereby said hub member may be connected with said bearing, with said lock body in engagement with either of said detent members and maintain said wheel in operative relation with said steering shaft, when engaged with the upper one of said detent members, and maintain said steering wheel disengaged from said steering shaft when engaged with the lower one of said detent members.

8. In a steering wheel; the combination with a hub member having an axial bore for a steering shaft; of a steering shaft mounted to slide axially in the axial bore of said hub member; means arranged to operatively connect said hub member and shaft, so that said shaft may be turned by said wheel, and to disconnect them so that said wheel may be turned idly on said shaft, without turning the latter, in accordance with the axial position of said hub member, on said shaft; a stationary bearing for said steering shaft, having a journal for said axial sleeve; detachable means connecting said shaft with said bearing, arranged to prevent axial movement of said shaft; a lock body having means arranged to selectively hold said hub member at the limits of its axial movement; whereby said lock is operative to maintain said wheel in operative relation with said steering shaft, at the upper limit of its axial movement, and to maintain said steering wheel disengaged from said steering shaft when at the lower limit of its axial movement; and means arranged to limit the axial movement of said hub member with respect to said steering shaft and prevent accidental removal of said wheel from said bearing.

9. In a steering wheel; the combination with a hub member having an axial bore for a steering shaft; of a steering shaft mounted to slide axially in the axial bore of said hub member; means arranged to operatively connect said hub member and shaft, so that said shaft may be turned by said wheel, and to disconnect them so that said wheel may be turned idly on said shaft, without turning the latter, in accordance with the axial position of said hub member, on said shaft; a stationary bearing for said steering shaft, having a journal for said axial sleeve; detachable means connecting said shaft with said bearing, arranged to prevent axial movement of said shaft; and a lock body having means arranged to selectively hold said hub member at the limits of its axial movement; whereby said lock is operative to maintain said wheel in operative relation with said steering shaft, at the upper limit of its axial movement, and to maintain said steering wheel disengaged from said steering shaft when at the lower limit of its axial movement.

10. The combination with a rotary steering shaft of an automotive vehicle, having steering wheel engaging means; of means arranged to prevent axial movement of said shaft, including a stationary bearing, in which it is journaled; a steering wheel hub member arranged to reciprocate axially on said shaft, to and from operative and inoperative relation with said wheel engaging means of said shaft; detachable means arranged to limit the axial movement of said hub member; means arranged to lock said hub member in both operative and inoperative relation with said shaft, including a cylindrical lock body; arranged to reciprocate bodily in said bearing, radially toward and away from said shaft, to engage and disengage said hub member; releasable means arranged to secure said lock body in position; a key, detachably fitted to turn in said lock body, and arranged to operate said releasable means; and detachable means arranged to prevent said lock body from turning in said bearing.

11. The combination with a rotary steering shaft of an automotive vehicle, having steering wheel engaging means; of means arranged to prevent axial movement of said shaft, including a stationary bearing, in which it is journaled; a steering wheel hub member arranged to reciprocate axially on said shaft, to and from operative and inoperative relation with said wheel engaging means of said shaft; detachable means arranged to limit the axial movement of said hub member; means arranged to lock said hub member in both operative and inoperative relation with said shaft, including a lock body, arranged to reciprocate bodily in said bearing, toward and away from said shaft, to engage and disengage said hub member; releasable means arranged to secure said lock body in position; and a key, detachably fitted to turn in said lock body, and arranged to operate said releasable means.

12. The combination with a rotary steering shaft of an automotive vehicle, having steering wheel engaging means; of means arranged to prevent axial movement of said shaft, including a stationary bearing, in which it is journaled; a steering wheel hub member arranged to reciprocate axially on said shaft, to and from operative and inoperative relation with said wheel engaging means of said shaft; means arranged to limit the axial movement of said hub member; means arranged to lock said hub member in both operative and inoperative relation with said shaft, including a lock body, arranged to reciprocate bodily in said bearing, toward and away from said shaft, to engage and disengage said hub member; and releasable means arranged to secure said lock body in position.

13. The combination with a rotary steering shaft of an automotive vehicle, having steering wheel engaging means; of means arranged to prevent axial movement of said shaft, including a stationary bearing, in which it is journaled; a steering wheel hub member arranged to reciprocate axially on said shaft, to and from operative and inoperative relation with said wheel engaging means of said shaft; and means arranged to lock said hub member in both operative and inoperative relation with said shaft, including a lock body, arranged to reciprocate bodily in said bearing, toward and away from said shaft, to engage and disengage said hub member.

14. The combination with a rotary steering shaft of an automotive vehicle, having steering wheel engaging means; of means arranged to prevent axial movement of said shaft, including a stationary bearing, in which it is journaled; a steering wheel hub member arranged to reciprocate axially on said shaft, to and from operative and inoperative relation with said wheel engaging means of said shaft; said hub member having a tubular sleeve encircling said shaft, with two annular detent members in axially spaced relation; and means arranged to lock said hub member in both operative and inoperative relation with said shaft, by respective engagement with said detent members.

15. The combination with a rotary steering shaft of an automotive vehicle, having steering wheel engaging means; of means arranged to prevent axial movement of said shaft, including a stationary bearing, in which it is journaled; a steering wheel hub member arranged to reciprocate axially on said shaft, to and from operative and inoperative relation with said wheel engaging means of said shaft; said hub member having a tubular sleeve encircling said shaft, with two detent members in axially spaced relation; and means arranged to lock said hub member in both operative and inoperative relation with said shaft, by respective engagement with said detent members.

In testimony whereof, I have hereunto signed my name at Philadelphia, Pennsylvania, this twentieth day of August, 1921.

ARTHUR E. PAIGE.

Witnesses:
FRANK E. PAIGE,
CAROLYN E. REUTER.